(12) United States Patent
Kawano

(10) Patent No.: US 10,775,554 B2
(45) Date of Patent: Sep. 15, 2020

(54) ILLUMINATION DEVICE HAVING LIGHT PIPE WITH CONCENTRIC ANNULAR PORTIONS

(71) Applicant: NICHIA CORPORATION, Anan-shi, Tokushima (JP)

(72) Inventor: Yohei Kawano, Tokushima (JP)

(73) Assignee: Nichia, Anan-shi (JP)

( * ) Notice: Subject to any disclaimer, the term of this patent is extended or adjusted under 35 U.S.C. 154(b) by 0 days.

(21) Appl. No.: 16/161,477

(22) Filed: Oct. 16, 2018

(65) Prior Publication Data
US 2019/0113677 A1   Apr. 18, 2019

(30) Foreign Application Priority Data

Oct. 17, 2017   (JP) .................. 2017-201041

(51) Int. Cl.
| | |
|---|---|
| *F21V 5/04* | (2006.01) |
| *F21V 8/00* | (2006.01) |
| *G02B 5/02* | (2006.01) |
| *F21V 13/04* | (2006.01) |
| *F21V 7/00* | (2006.01) |
| *F21V 5/00* | (2018.01) |

(Continued)

(52) U.S. Cl.
CPC ............ *G02B 6/0096* (2013.01); *F21V 5/008* (2013.01); *F21V 7/0091* (2013.01); *F21V 13/04* (2013.01); *G02B 5/0215* (2013.01); *G02B 5/0221* (2013.01); *G02B 6/0045* (2013.01); *G02B 6/0055* (2013.01); *G02B 19/0023* (2013.01); *G02B 19/0066* (2013.01);

*F21Y 2101/00* (2013.01); *F21Y 2115/10* (2016.08); *G02B 5/02* (2013.01); *G02B 27/0994* (2013.01)

(58) Field of Classification Search
CPC . F21K 9/61; F21V 5/007; F21V 5/045; F21Y 2105/10; F21Y 2105/18; F21Y 2115/10; G02B 6/0008; G02B 6/04
See application file for complete search history.

(56) References Cited

U.S. PATENT DOCUMENTS 6,443,582 B1 *   9/2002   Tarne ..................... G02B 6/003
                                                                362/23.16
6,527,411 B1 *   3/2003   Sayers .................... F21V 5/007
                                                                362/245
(Continued)

FOREIGN PATENT DOCUMENTS

DE   102017108113 A1 * 10/2018 ......... G02B 19/0066
JP   2013-502685 A     1/2013
(Continued)

*Primary Examiner* — Ismael Negron
(74) *Attorney, Agent, or Firm* — Birch, Stewart, Kolasch & Birch, LLP

(57) ABSTRACT

A light pipe includes an emission end portion with a light exit surface and a back surface opposite the light exit surface; a columnar light-guide portion protruding from the back surface; and at least one annular light-guide portion protruding from the back surface and concentrically surrounding the columnar light-guide portion; and a gap separating the annular light-guide portion and the columnar light-guide portion. An illumination device includes a light source unit having an annular array of light emitting diodes; a reflector; and the light pipe positioned between the light source unit and the reflector.

11 Claims, 8 Drawing Sheets

(51) Int. Cl.
*G02B 19/00* (2006.01)
*F21Y 101/00* (2016.01)
*F21Y 115/10* (2016.01)
*G02B 27/09* (2006.01)

(56) References Cited

U.S. PATENT DOCUMENTS

| | | | | |
|---|---|---|---|---|
| 6,814,479 | B2* | 11/2004 | Aynie | B60Q 1/0052 |
| | | | | 362/511 |
| 7,261,452 | B2* | 8/2007 | Coushaine | F21K 9/00 |
| | | | | 362/507 |
| 7,618,171 | B2* | 11/2009 | Tessnow | F21S 48/1154 |
| | | | | 362/511 |
| 7,837,364 | B2* | 11/2010 | Budinger | B64D 47/02 |
| | | | | 362/470 |
| 8,827,504 | B2* | 9/2014 | Parker | F21V 3/02 |
| | | | | 362/341 |
| 9,423,101 | B2* | 8/2016 | Holten | F21V 7/0091 |
| 9,573,512 | B2* | 2/2017 | Kumar | F21V 5/04 |
| 9,890,926 | B2* | 2/2018 | Preston | F21V 7/0091 |
| 2010/0283369 | A1* | 11/2010 | Chen | F21V 3/00 |
| | | | | 313/1 |
| 2012/0147621 | A1 | 6/2012 | Holten et al. | |
| 2014/0036510 | A1 | 2/2014 | Preston et al. | |
| 2015/0212263 | A1* | 7/2015 | Tzeng | G02B 6/0096 |
| | | | | 362/555 |
| 2017/0314753 | A1* | 11/2017 | Gammer | F21K 9/64 |
| 2019/0293261 | A1* | 9/2019 | Jiang | F21V 5/008 |

FOREIGN PATENT DOCUMENTS

| | | |
|---|---|---|
| JP | 2014-115506 A | 6/2014 |
| JP | 2014-126604 A | 7/2014 |
| JP | 2015-529849 A | 10/2015 |
| JP | 2016-212962 A | 6/2016 |

* cited by examiner

ILLUMINATION DEVICE HAVING LIGHT PIPE WITH CONCENTRIC ANNULAR PORTIONS

CROSS-REFERENCE TO RELATED APPLICATIONS

The present application claims priority to Japanese Patent Application No. 2017-201041, filed on Oct. 17, 2017, the contents of which are hereby incorporated by reference in their entirety

BACKGROUND OF THE INVENTION

1. Field of the Invention

The present invention relates to a light pipe and an illumination device.

2. Description of Related Art

Light-guide members called light pipes are known in which incident light from point sources is reflected by lateral surfaces a plurality of times to provide a uniform light-emitting surface (for example, see Japanese Unexamined Patent Application Publication No. 2014-126604).

SUMMARY OF THE INVENTION

Certain embodiments of the present invention provides a light pipe and an illumination device in which the size of a light-emitting surface can be adjusted, with a simple structure.

According to one embodiment of the present invention, a light pipe includes an emission end portion having a light exit surface; a columnar light-guide portion protruding from a surface of the emission end portion opposite to the light exit surface; and one or two or more annular light-guide portions protruding from the surface of the emission end portion opposite to the light exit surface and concentrically surrounding the columnar light-guide portion while spaced apart from the columnar light-guide portion.

According to certain embodiments of the present invention, the size of the light-emitting surface can be adjusted with a simple structure.

DETAILED DESCRIPTION OF EMBODIMENTS

Figure 1:
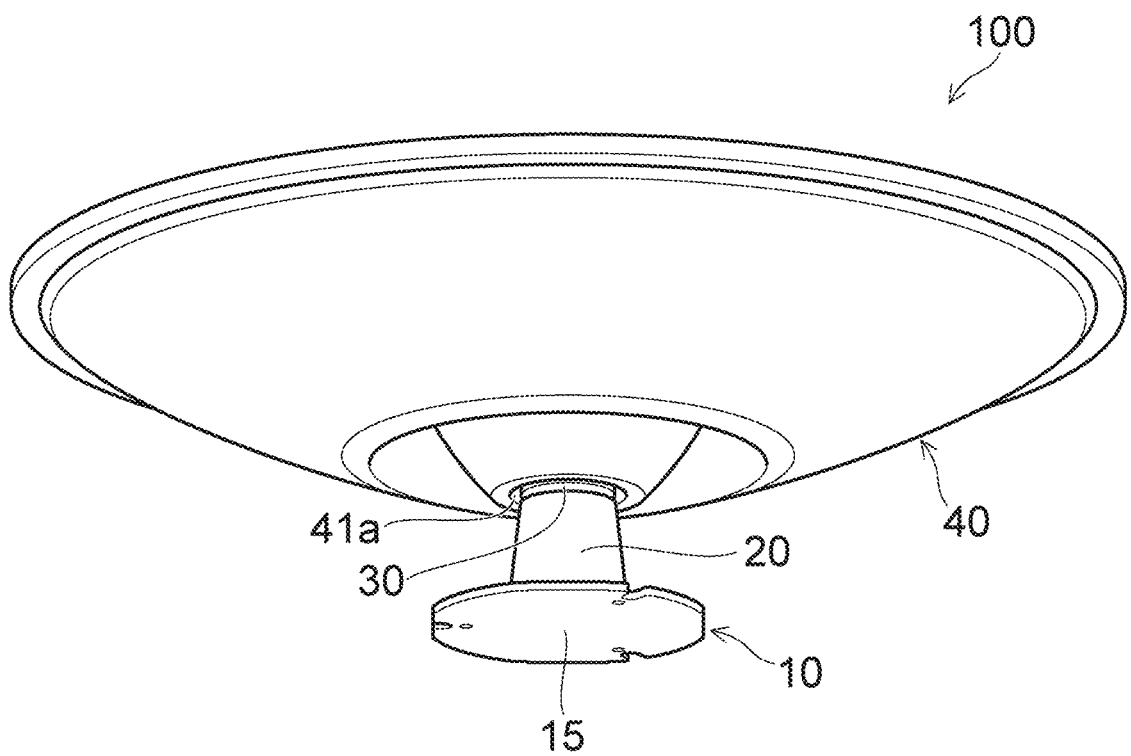
FIG. 1 is a schematic perspective view of an illumination device of a first embodiment of the present invention.

A first embodiment of the present invention will be described below referring to the accompanying drawings. In the drawings, the same reference numeral is assigned to the same constituent.

FIG. 1 is a schematic perspective view of an illumination device 100 of the first embodiment of the present invention.

Figure 2:
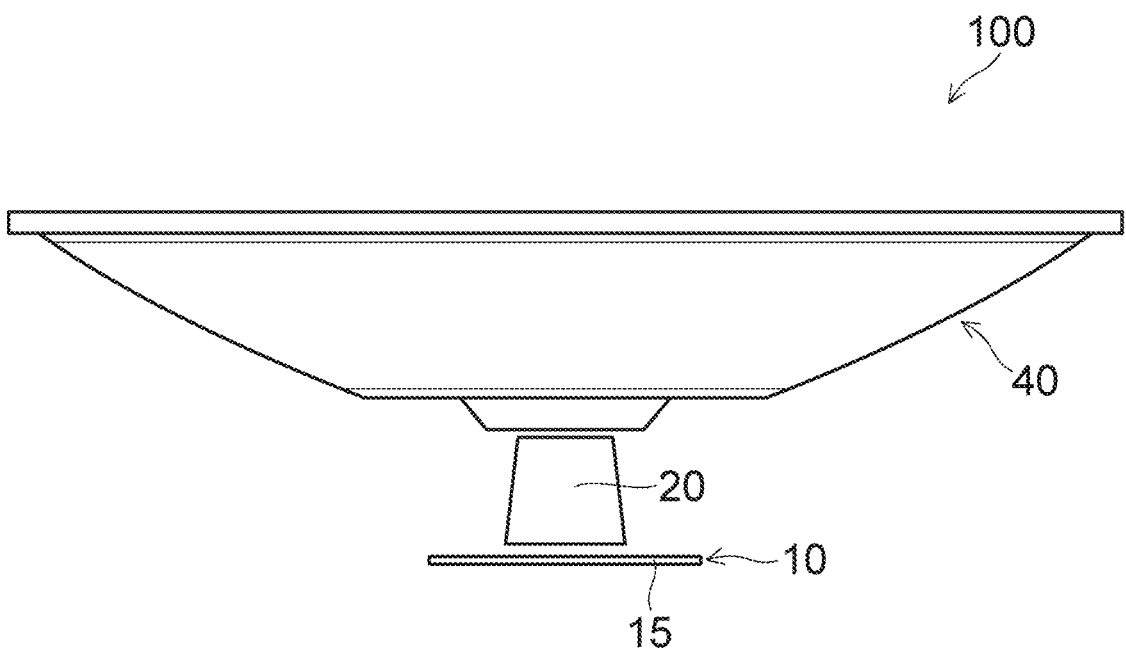
FIG. 2 is a schematic side view of the illumination device of the first embodiment of the present invention.

FIG. 2 is a schematic side view of the illumination device 100.

Figure 3:
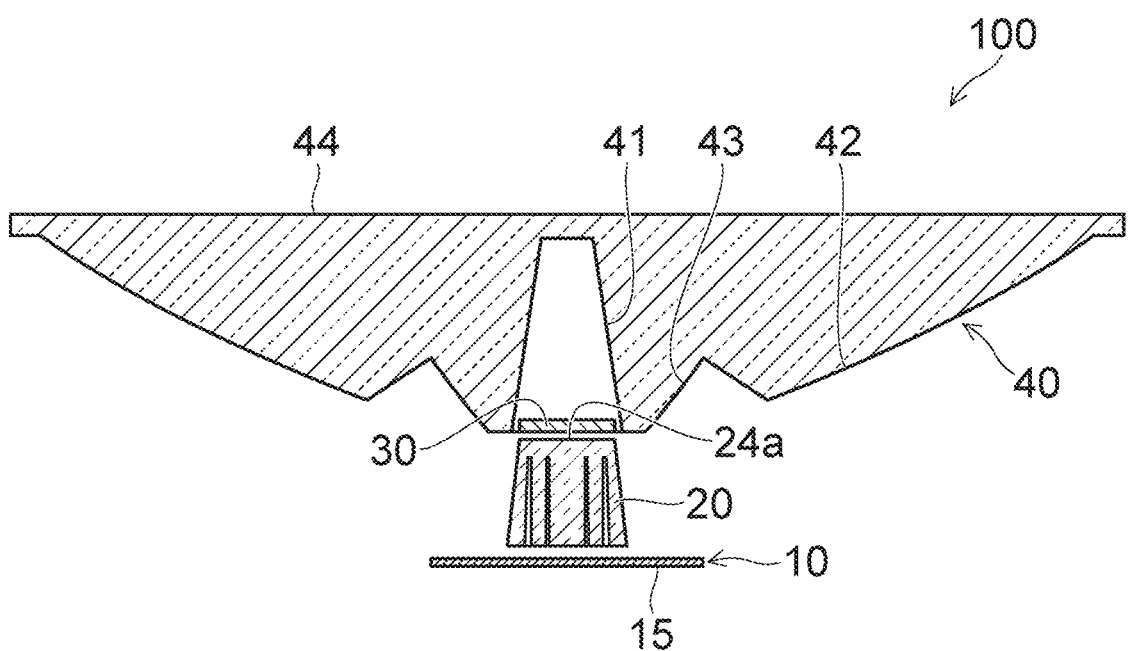
FIG. 3 is a schematic cross-sectional view of the illumination device of the first embodiment of the present invention.

FIG. 3 is a schematic cross-sectional view of the illumination device 100.

The illumination device 100 includes a light source 10, a light pipe 20, a diffuser 30, and a reflector 40.

The light pipe 20 is disposed between the light source 10 and the reflector 40. The diffuser 30 is disposed between the light pipe 20 and the reflector 40.

Description on the light pipe 20 will be given.

Figure 4A:
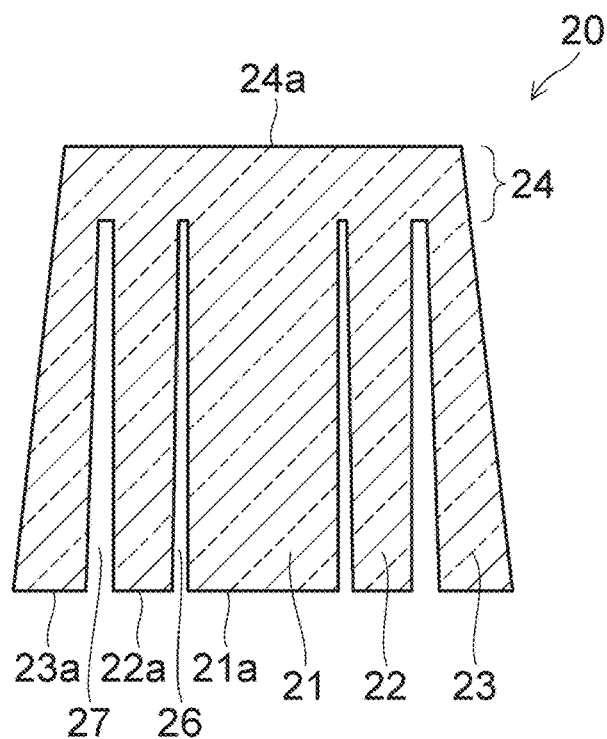
FIG. 4A is a schematic cross-sectional view of a light pipe of the first embodiment of the present invention.

FIG. 4A is a schematic cross-sectional view of the light pipe 20.

Figure 4B:
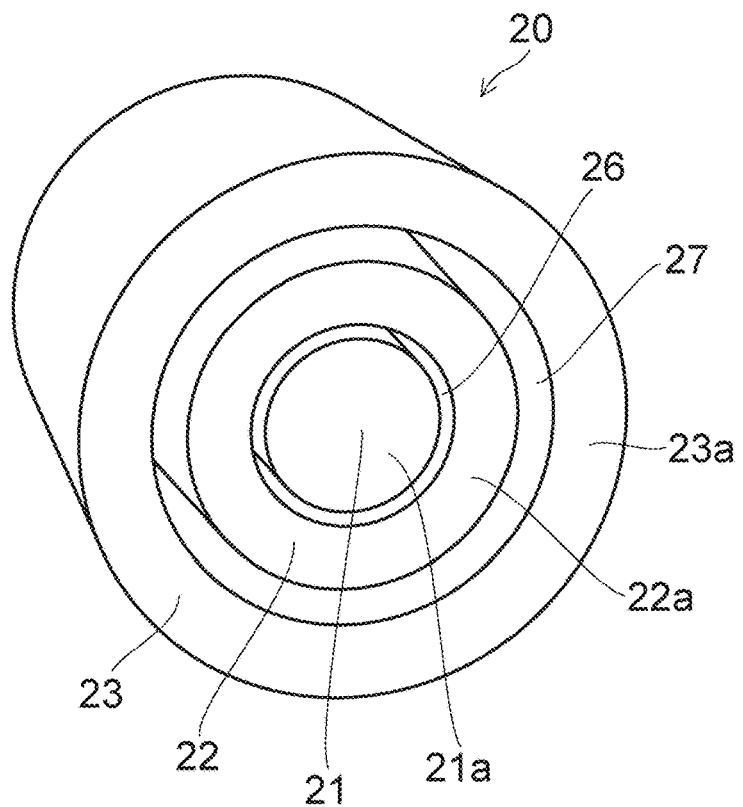
FIG. 4B is a schematic perspective view of the light pipe of the first embodiment of the present invention.

FIG. 4B is a schematic perspective view of the light pipe 20 viewed from the incident surface.

The light pipe 20 includes an emission end portion 24, one columnar light-guide portion 21, and one or two or more annular light-guide portions 22 and 23. FIGS. 4A and 4B show an illustrative structure including two annular light-guide portions 22 and 23.

The light pipe 20 is made of a transparent material that transmits light emitted from the light source 10. For example, the emission end portion 24, the columnar light-guide portion 21, and the annular light-guide portions 22 and 23 are made of a resin material as an integrated body. Examples of the resin material include acrylic resins, such as polymethyl methacrylate (PMMA), and polycarbonates (PC). The light pipe 20 may be made of glass.

The light pipe 20 has a cylindrical or truncated conical shape as a whole in appearance, and grooves 26 and 27 extending in the axis direction are formed in portions of the cylinder or truncated cone. The groove 27 has a width greater than a width of the groove 26 at the incident surface.

The emission end portion 24 is located at one end of the light pipe 20 in the axis direction. The emission end portion 24 has, for example, a circular light exit surface 24a.

The columnar light-guide portion 21 protrudes from a surface of the emission end portion 24 opposite to the light exit surface 24a in the direction away from the light exit surface 24a. The central axis of the columnar light-guide portion 21 coincides with the center of the light exit surface 24a. The protrusion length (length in the axis direction) of the columnar light-guide portion 21 is larger than the thickness of the emission end portion 24. Increase in the protrusion length of the columnar light-guide portion 21 allows for securing the optical path length, and the light diffusion effect can be enhanced.

For example, the columnar light-guide portion 21 has a circular incident surface 21a at an end thereof in a protruding direction of the columnar light-guide portion 21, as shown in FIG. 4B. The area of the incident surface 21a is smaller than the area of the light exit surface 24a. Each of the light exit surface 24a and the incident surface 21a may alternatively have any appropriate shape other than a circle, and may have a shape of an ellipse, a distorted circle, a shape having corners.

As in the columnar light-guide portion 21, the annular light-guide portions 22 and 23 protrude from the surface of the emission end portion 24 opposite to the light exit surface 24a in the direction away from the light exit surface 24a. The light pipe 20 is formed by, for example, resin molding using a mold. In order to ensure a draft angle for releasing the resin molded article from the mold, the columnar light-guide portion 21 and the annular light-guide portions 22 and 23 protrude (i.e., extend) from the emission end portion 24, with the lateral surfaces of the columnar light-guide portion 21 and the annular light-guide portions 22 and 23 being slightly inclined such that the widths of the grooves 26 and 27 increase from the emission end portion 24 toward the incident surfaces 21a, 22a, and 23a.

The annular light-guide portion 22 is spaced apart from the columnar light-guide portion 21 and concentrically surrounds the columnar light-guide portion 21. The annular groove 26 defined by the columnar light-guide portion 21 and the annular light-guide portion 22.

The inside of the groove 26 is a gap. In other words, the annular light-guide portion 22 is spaced apart from the columnar light-guide portion 21 by the gap. This structure allows light entered the columnar light-guide portion 21 to be totally reflected at the interface (lateral surface of the columnar light-guide portion 21) between the columnar light-guide portion 21 and the groove 26 repeatedly and to be guided to the emission end portion 24.

For example, the annular light-guide portion 22 concentrically surrounds the columnar light-guide portion 21 in a continuous manner. The annular light-guide portion 22 has the incident surface 22a at an end thereof in the protruding direction of the annular light-guide portion 22, as shown in FIG. 4B. The incident surface 22a has a shape of, for example, a circular ring concentrically surrounding the incident surface 21a of the columnar light-guide portion 21 in a continuous manner.

The annular light-guide portion 23 is spaced apart from the annular light-guide portion 22 and concentrically surrounds the annular light-guide portion 22. The annular groove 27 is defined by the annular light-guide portion 22 and the annular light-guide portion 23. The inside of the groove 27 is a gap. In other words, the annular light-guide portion 23 is separated from the annular light-guide portion 22 by the gap. This structure allows light entered the annular light-guide portion 22 to be totally reflected at the interface (i.e., inner circumferential surface of the annular light-guide portion 22) between the annular light-guide portion 22 and the groove (i.e., gap) 26 and the interface (i.e., outer circumferential surface of the annular light-guide portion 22) between the annular light-guide portion 22 and the groove (i.e., gap) 27 repeatedly and to be guided to the emission end portion 24.

For example, the annular light-guide portion 23 concentrically surrounds the annular light-guide portion 22 in a continuous manner. The annular light-guide portion 23 has the incident surface 23a at an end thereof in the protruding direction of the annular light-guide portion 23, as shown in FIG. 4B. The incident surface 23a has a shape of, for example, a circular ring concentrically surrounding the incident surface 22a of the annular light-guide portion 22 in a continuous manner. The shapes of the incident surfaces 22a and 23a may alternatively have a shape other than a circular ring shape, such as an elliptic shape, a distorted circular shape, and a ring-shape having a corner are also possible.

The outer diameter of the incident surface 23a is larger than the outer diameter of the incident surface 22a, and the outside diameter of the incident surface 22a is larger than the diameter of the incident surface 21a. Each of the annular light-guide portions 22 and 23 has a protrusion length (i.e., a length in the axis direction) larger than a thickness of the emission end portion 24. Increase in the protrusion lengths of the annular light-guide portions 22 and 23 allows for securing the optical path lengths, and thus the light diffusion effect can be enhanced.

As shown in FIG. 4A, the grooves (i.e., gaps) 26 and 27 extend from the incident surfaces 21a, 22a, and 23a toward the emission end portion 24 but do not reach the light exit surface 24a. The portion without the grooves 26 and 27 in the axis direction serves as the emission end portion 24. The columnar light-guide portion 21 and the annular light-guide portions 22 and 23, with the grooves 26 and 27 therebetween, are formed integrally with the emission end portion 24.

The term "annular" of the annular light-guide portions 22 and 23 as used herein includes not only a circular shape (i.e., perfect circle) but also includes an elliptic shape, a distorted circular shape, and an annular shape having a corner. Accordingly, the annular light-guide portions 22 and 23 are not limited to have shapes to surround the columnar light-guide portion 21 such that the annular light-guide portions 22 and 23 and the columnar light-guide portion 21 are concentric circles, as long as the shapes concentrically surround the columnar light-guide portion 21.

It is desirable that the annular light-guide portion 22 and the columnar light-guide portion 21 be entirely separated from each other along the axis direction, but the annular light-guide portion 22 and the columnar light-guide portion 21 may be partially connected. In other words, large portions of the annular light-guide portion 22 and the columnar light-guide portion 21 may be spaced apart from each other by the groove (gap) 26 while the other portions thereof are connected without substantially affecting unevenness in the color and illuminance of light emitted from the light exit surface 24a.

Similarly, it is desirable that the annular light-guide portion 22 and the annular light-guide portion 23 be entirely separated from each other along the axis direction, but the annular light-guide portion 22 and the annular light-guide portion 23 may be partially connected. In other words, large portions of the annular light-guide portion 22 and the annular light-guide portion 23 may be spaced apart from each other by the groove (gap) 27 while the other portions are connected, without substantially affecting unevenness in the color and illuminance of light emitted from the light exit surface 24a.

Subsequently, the light source 10 will be described referring to FIG. 5A.

The light source 10 includes a plurality of light-emitting diodes (LEDs) serving as point light sources. The plurality of LEDs are mounted on a substrate 15. The plurality of LEDs include one or a plurality of central LEDs 11 and a plurality of peripheral LEDs 12 and 13 disposed surrounding the central LEDs 11.

Figure 5A:
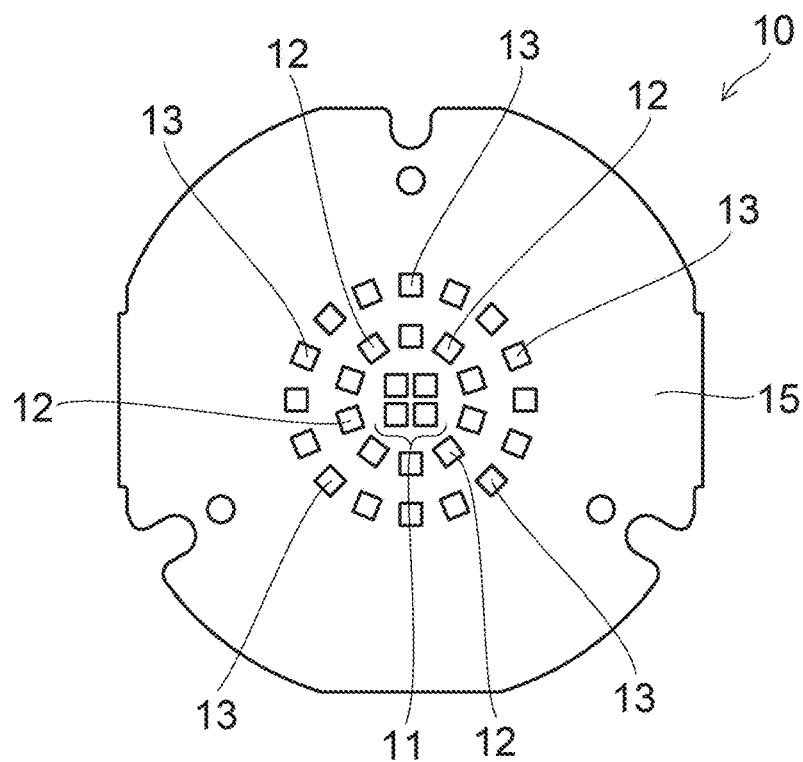
FIG. 5A is a schematic plan view of a light source of the first embodiment of the present invention.

In the example shown in FIG. 5A, for example, four central LEDs 11 are disposed on a central portion of the substrate 15. The peripheral LEDs 12 are annularly disposed surrounding the central LEDs 11, and the peripheral LEDs 13 are annularly disposed surrounding the peripheral LEDs 12.

The number of the peripheral LEDs 12 is larger than the number of the central LEDs 11, and the number of the peripheral LEDs 13 is larger than the number of the peripheral LEDs 12.

These LEDs 11, 12, and 13 are respectively electrically connected to a respective one of wirings formed on the substrate 15.

For example, the LEDs 11, 12, and 13 in the form of bare chips or packaged products (including the form of chip-scale packages) are surface-mounted on the substrate 15.

The LEDs 11, 12, and 13 are disposed to face the incident surfaces 21a, 22a, and 23a of the light pipe 20, respectively.

Figure 5B:
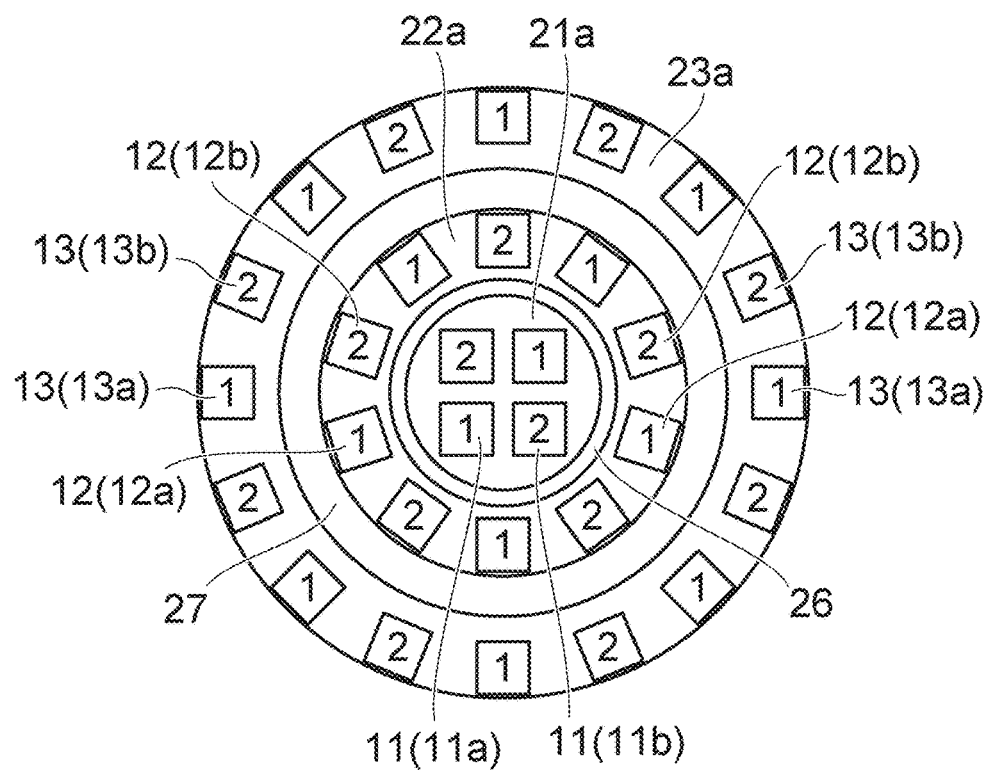
FIG. 5B is a schematic plan view for illustrating the positional relationship between the light pipe and LEDs in the first embodiment of the present invention.

FIG. 5B is a schematic plan view for illustrating the positional relationships between the LEDs 11, 12, and 13 and the incident surfaces 21a, 22a, and 23a of the light pipe 20.

The central LEDs 11 are disposed to face the incident surface 21a of the columnar light-guide portion 21. The peripheral LEDs 12 are annularly disposed along the circumference of the incident surface 22a of the annular light-guide portion 22 to face the incident surface 22a. The peripheral LEDs 13 are annularly disposed along the circumference of the incident surface 23a of the annular light-guide portion 23 to face the incident surface 23a.

The central LEDs 11 include first LEDs 11a and second LEDs 11b. The peripheral LEDs 12 include first LEDs 12a and second LEDs 12b. The peripheral LEDs 13 include first LEDs 13a and second LEDs 13b. In FIG. 5B, the first LEDs 11a, 12a, and 13a are denoted by "1", and the second LEDs 11b, 12b, and 13b are denoted by "2".

The emission color (more specifically, color temperature) of the first LEDs 11a differs from the emission color (more specifically, color temperature) of the second LEDs 11b. For example, either the first LEDs 11a or the second LEDs 11b has an emission color of white, and the other of the first LEDs 11a or the second LEDs 11b has an emission color of warm white.

The emission color (more specifically, color temperature) of the first LEDs 12a differs from the emission color (more specifically, color temperature) of the second LEDs 12b. For example, either the first LEDs 12a or the second LEDs 12b has an emission color of white, and the other of the first LEDs 12a and the second LEDs 12b has an emission color of warm white.

The emission color (more specifically, color temperature) of the first LEDs 13a differs from the emission color (more specifically, color temperature) of the second LEDs 13b. For example, either the first LEDs 13a or the second LEDs 13b has an emission color of white, and the other of the first LEDs 13a and the second LEDs 13b has an emission color of warm white.

In the example shown in FIG. 5B, the four central LEDs 11 include two first LEDs 11a and two second LEDs 11b, and the first LEDs 11a and the second LEDs 11b are alternately disposed surrounding the center of the incident surface 21a.

The first LEDs 12a and the second LEDs 12b of the peripheral LEDs 12 are alternately disposed in the annular direction along the circumference of the incident surface 22a.

The first LEDs 13a and the second LEDs 13b of the peripheral LEDs 13 are alternately disposed in the annular direction along the circumference of the incident surface 23a.

Alternate arrangement of the first LEDs 11a, 12a, and 13a and the second LEDs 11b, 12b, and 13b as described above allows for enhancing the color mixing performance.

As shown in FIG. 1 and FIG. 3, the diffuser 30 is disposed to face the light exit surface 24a of the light pipe 20. The diffuser 30 is made of, for example, frosted glass. The diffuser 30 further diffuses light emitted from the light exit surface 24a of the light pipe 20 and mixes the colors of the light.

Figure 6:
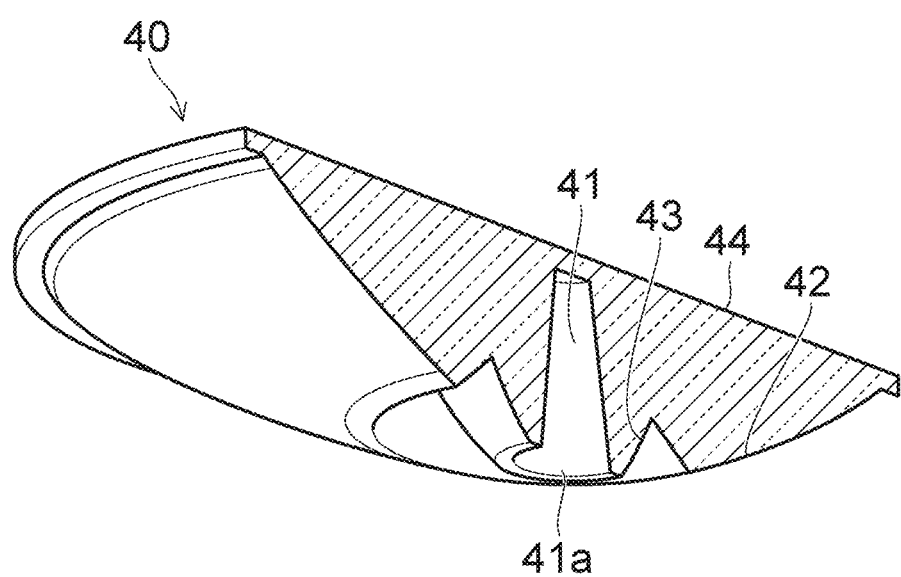
FIG. 6 is a schematic, perspective, cross-sectional view of a reflector of the first embodiment of the present invention.

FIG. 6 is a schematic, perspective, cross-sectional view of the reflector 40.

As shown in FIG. 3 and FIG. 6, the reflector 40 has a tubular portion 41, a reflection surface 43 extending surrounding the tubular portion 41, a reflection surface 42 extending surrounding the reflection surface 43, and an upper surface 44. The reflection surface 43 is continuous with the reflection surface 42 with a step therebetween.

The tubular portion 41 has an opening 41a at an end (i.e., lower end) thereof in the axis direction.

The diffuser 30 is disposed inside or near the opening 41a. The tubular portion 41 is closed at the other end (i.e., upper end) thereof in the axis direction.

The reflection surface 43 and the reflection surface 42 differ from each other in inclination angle with respect to the central axis of the tubular portion 41 or in curvature.

The reflector 40 is, for example, an integrally-molded article made of a resin material (such as PMMA). A metal film (such as an aluminum film) is formed on the reflection surface 42. A similar metal film may be formed on the reflection surface 43.

Light emitted from the light source 10 enters the light pipe 20. Light emitted from the central LEDs 11 enters the columnar light-guide portion 21 through the incident surface 21a. Light emitted from the peripheral LEDs 12 enters the annular light-guide portion 22 through the incident surface 22a. Light emitted from the peripheral LEDs 13 enters the annular light-guide portion 23 through the incident surface 23a.

The central LEDs 11, the peripheral LEDs 12, and the peripheral LEDs 13 can be separately controlled. Further, the first LEDs 11a and the second LEDs 11b of the central LEDs 11 can be separately controlled, the first LEDs 12a and the second LEDs 12b of the peripheral LEDs 12 can be separately controlled, and the first LEDs 13a and the second LEDs 13b of the peripheral LEDs 13 can be separately controlled. The expression "control" as used herein includes the on-off control of the LEDs and the control of current values.

Accordingly, in the first embodiment, an operating mode can be selected by switching among three operating modes: a "small mode" in which only the central LEDs 11 emit light; a "middle mode" in which the central LEDs 11 and the peripheral LEDs 12 emit light and in which the peripheral LEDs 13 do not emit light; and a "large mode" in which the central LEDs 11, the peripheral LEDs 12, and the peripheral LEDs 13 emit light.

Figure 7A:
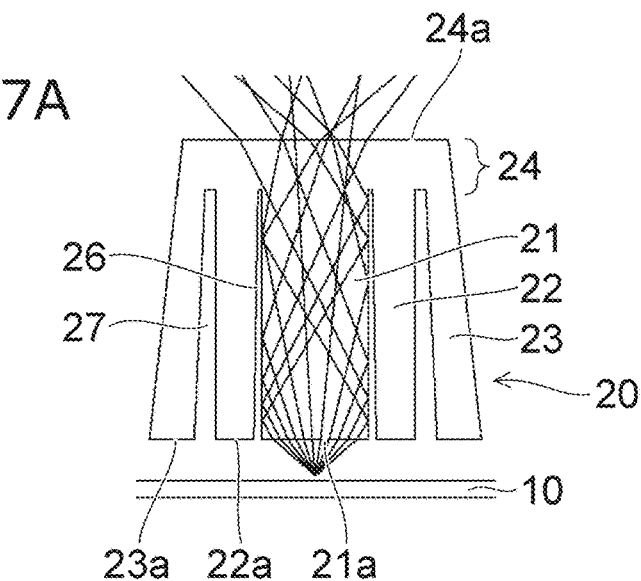
FIG. 7A is a schematic ray diagram showing light guided within the light pipe of the first embodiment of the present invention.

FIG. 7A is a ray diagram (i.e., simulation) showing light guided within the light pipe 20 in the small mode.

In the small mode, only the central LEDs 11 in the light source 10 emit light. The light emitted from the central LEDs 11 enters the columnar light-guide portion 21 through the incident surface 21a and does not enter the annular light-guide portions 22 and 23. The light having entered the columnar light-guide portion 21 is totally reflected at the interface (i.e., lateral surface of the columnar light-guide portion 21) between the columnar light-guide portion (resin) 21 and the groove (gap) 26 repeatedly, so that the light is guided to the emission end portion 24. The light guided to the emission end portion 24 spreads to a diameter larger than the diameter of the columnar light-guide portion 21 and is emitted from the light exit surface 24a.

Figure 7B:
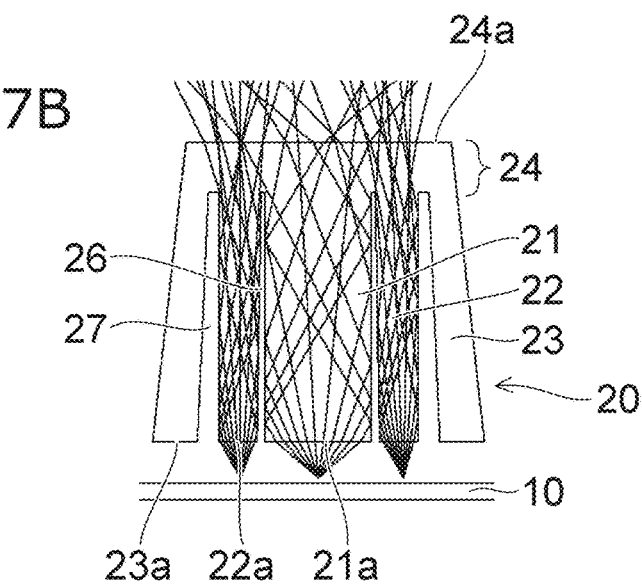
FIG. 7B is a schematic ray diagram showing light guided within the light pipe of the first embodiment of the present invention.

FIG. 7B is a ray diagram (i.e., simulation) showing light guided within the light pipe 20 in the middle mode.

In the middle mode, the central LEDs 11 and the peripheral LEDs 12 in the light source 10 emit light, and the peripheral LEDs 13 do not emit light. A light emitted from the central LEDs 11 enters the columnar light-guide portion 21 through the incident surface 21a, and A light emitted from the peripheral LEDs 12 enters the annular light-guide portion 22 through the incident surface 22a. The light emitted from the central LEDs 11 and the light emitted from the peripheral LEDs 12 does not enter the annular light-guide portion 23.

The light having entered the columnar light-guide portion 21 is totally reflected by the interface (i.e., lateral surface of the columnar light-guide portion 21) between the columnar light-guide portion (i.e., resin) 21 and the groove (i.e., gap) 26 repeatedly, so that the light is guided to the emission end portion 24.

The light having entered the annular light-guide portion 22 is totally reflected by the interface (i.e., inner circumferential surface of the annular light-guide portion 22) between the annular light-guide portion (i.e., resin) 22 and the groove (i.e., gap) 26 and the interface (i.e., outer circumferential surface of the annular light-guide portion 22) between the annular light-guide portion (i.e., resin) 22 and the groove (i.e., gap) 27 repeatedly, so that the light is guided to the emission end portion 24.

The light spreads to a diameter larger than the outside diameter of the annular light-guide portion 22 in the emission end portion 24 and is emitted from the light exit surface 24a. The size (i.e., area or diameter) of the light-emitting surface in the light exit surface 24a in the middle mode is larger than the size (i.e., area or diameter) of the light-emitting surface in the light exit surface 24a in the small mode.

Figure 7C:
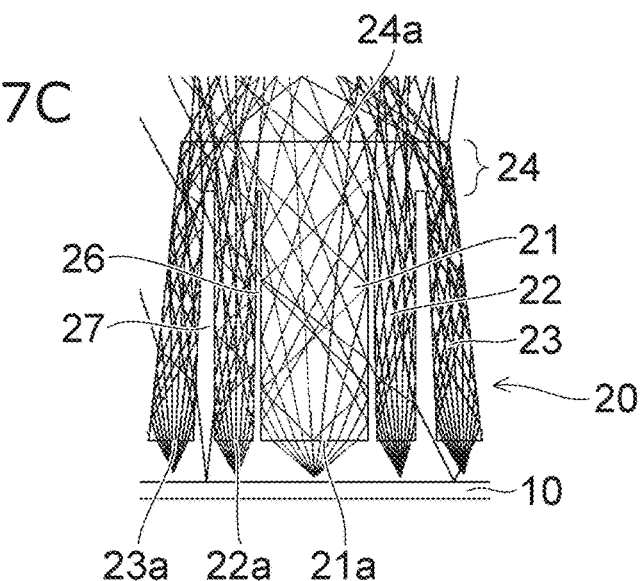
FIG. 7C is a schematic ray diagram showing light guided within the light pipe of the first embodiment of the present invention.

FIG. 7C is a ray diagram (simulation) showing light guided within the light pipe 20 in the large mode.

In the large mode, the central LEDs 11, the peripheral LEDs 12, and the peripheral LEDs 13 in the light source 10 emit light. A light emitted from the central LEDs 11 enters the columnar light-guide portion 21 through the incident surface 21a, a light emitted from the peripheral LEDs 12 enters the annular light-guide portion 22 through the incident surface 22a, and a light emitted from the peripheral LEDs 13 enters the annular light-guide portion 23 through the incident surface 23a.

The light having entered the columnar light-guide portion 21 is totally reflected at the interface (i.e., lateral surface of the columnar light-guide portion 21) between the columnar light-guide portion (i.e., resin) 21 and the groove (i.e., gap) 26 repeatedly, so that the light is guided to the emission end portion 24.

The light having entered the annular light-guide portion 22 is totally reflected at the interface (i.e., inner circumferential surface of the annular light-guide portion 22) between the annular light-guide portion (i.e., resin) 22 and the groove (i.e., gap) 26 and the interface (i.e., outer circumferential surface of the annular light-guide portion 22) between the annular light-guide portion (i.e., resin) 22 and the groove (i.e., gap) 27 repeatedly, so that the light is guided to the emission end portion 24.

The light having entered the annular light-guide portion 23 is totally reflected at the interface (i.e., inner circumferential surface of the annular light-guide portion 23) between the annular light-guide portion (i.e., resin) 23 and the groove (i.e., gap) 27 and the interface (i.e., outer circumferential surface of the annular light-guide portion 23) between the annular light-guide portion (i.e., resin) 23 and the outside (i.e., air) of the annular light-guide portion 23 repeatedly, so that the light is guided to the emission end portion 24.

The light spreads in the emission end portion 24 and is emitted from almost the entire light exit surface 24a. The size (i.e., area or diameter) of the light-emitting surface in the light exit surface 24a in the large mode is larger than the size (i.e., area or diameter) of the light-emitting surface in the light exit surface 24a in the middle mode.

Repetition of total reflection of light at the lateral surface of the columnar light-guide portion 21 and the lateral surfaces (i.e., inner circumferential surfaces and outer circumferential surfaces) of the annular light-guide portions 22 and 23 allows mixing of emission color, so that degree of being granular in appearance of light emitted from the LEDs, which are point light sources, and variation in emission color of the LEDs can be reduced.

Further, light that has entered the emission end portion 24 from the columnar light-guide portion 21, the annular light-guide portion 22, and the annular light-guide portion 23 spreads in the emission end portion 24, so that boundaries (i.e., shades) between the light beams respectively guided through the columnar light-guide portion 21, the annular light-guide portion 22, and the annular light-guide portion 23 is difficult to see.

Unevenness in illuminance and color is thus reduced.

Adjustment of a thickness of the emission end portion 24 allows for controlling the size of the light-emitting surface in the light exit surface 24a. Increase in a thickness the emission end portion 24 allows increase in size of the light-emitting surface.

Reduction in a thickness of the emission end portion 24 allows reduction in size of the light-emitting surface.

Light emitted from the light exit surface 24a of the light pipe 20 enters the diffuser 30 shown in FIG. 3. The light that has entered the diffuser 30 further spreads in the diffuser 30. A portion of light emitted from the diffuser 30 travels upward within the tubular portion 41 of the reflector 40, enters the reflector 40 through the upper and lateral surfaces of the tubular portion 41, and is emitted from the upper surface 44 of the reflector 40 to the outside.

Another portion of light emitted from the diffuser 30 is refracted at the lateral surface of the tubular portion 41, then reflected at the reflection surface 43 and guided upward, and emitted from the upper surface 44 of the reflector 40 to the outside.

Still another portion of light emitted from the diffuser 30 is refracted at the lateral surface of the tubular portion 41 to travel toward the upper surface 44 of the reflector 40, reflected at the upper surface 44 of the reflector 40 to travel toward the reflection surface 42, reflected at the reflection surface 42 to be guided upward, and then emitted from the upper surface 44 of the reflector 40 to the outside.

The illumination device 100 employing the reflector 40 having the structure exemplified in FIG. 3 can emit collimated light. Combination of a plurality of such illumination devices 100 configured to emit collimated light allows for constructing a shadowless lighting system can be constructed.

According to the embodiment described above, the size of the light-emitting surface (LES) of the light pipe 20 can be adjusted, and the irradiation area of the illumination device 100 can be controlled.

The light pipe 20 does not need to have a size-adjustable structure.

The size of the light-emitting surface can be adjusted by controlling light emission in accordance with the arrangement of the LEDs without complication of the structure. Also, reduction in the diameter of the columnar light-guide portion 21 and the widths in the radial direction of the annular light-guide portions 22 and 23 allows for increasing the number of repetitions of total reflection within the columnar light-guide portion 21 and the annular light-guide portions 22 and 23 while preventing increase in the length (i.e., height) of the light pipe 20 small. This structure allows for improving the color mixing performance and reducing unevenness in color and illuminance while preventing increase in the size of the illumination device 100 as a whole, so that a light-emitting surface with a uniform emission can be obtained.

Figure 8A:
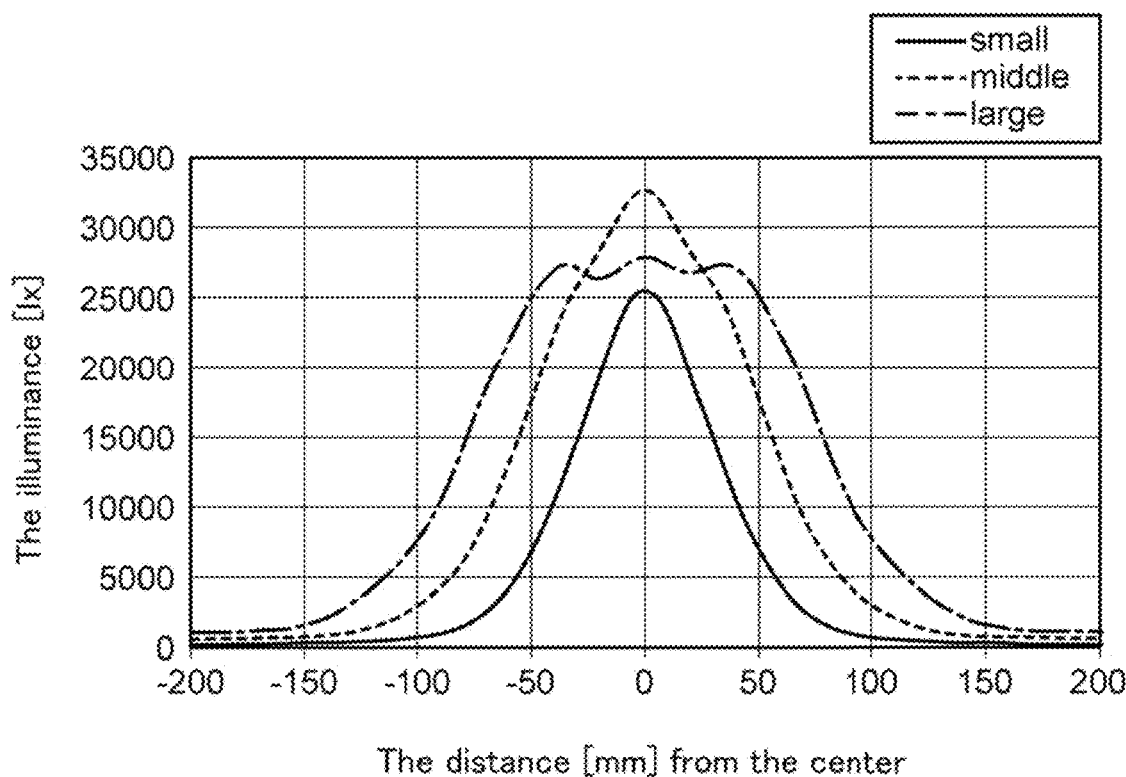
FIG. 8A is a graph showing an illuminance distribution based on a simulation using the light pipe of the first embodiment of the present invention.

FIG. 8A is a graph showing an illuminance distribution based on a simulation using the light pipe 20 of the embodiment of the present invention. In the simulation, PMMA is used as a material of the light pipe 20, the light pipe 20 has a height of 18 mm; each of the grooves 26 and 27 has a depth of 15 mm; the diameter of the incident surface 21a of the columnar light-guide portion 21 is 6.4 mm; the outer diameter of the incident surface 22a of the annular light-guide portion 22 is 12 mm; the outer diameter of the incident surface 23a of the annular light-guide portion 23 is 20 mm; the width of the groove 26 and the width of the groove 27 are 0.5 mm and 1.3 mm, respectively, at the incident surfaces 21a, 22a, and 23a; and the diameter of the light exit surface 24a of the emission end portion 24 is 16 mm. LEDs each having a square shape of side 2.1 mm in a top view are used for the LEDs 11, 12, and 13. With four central LEDs 11, ten peripheral LEDs 12 are concentrically arranged to have a diameter of 10 mm, and 16 peripheral LEDs 13 are concentrically arranged to have a diameter of 18 mm.

The illuminance [lx] indicated by the vertical axis is the illuminance on an irradiated surface located at a distance of 1.1 m from the light exit surface 24a of the light pipe 20. The horizontal axis indicates the distance [mm] from the center, which is the basis of the distance (0 mm), of the irradiated surface.

In FIG. 8A, the solid line indicates the small mode, the broken line indicates the middle mode, and the dash-dot line indicates the large mode.

Figure 8B:
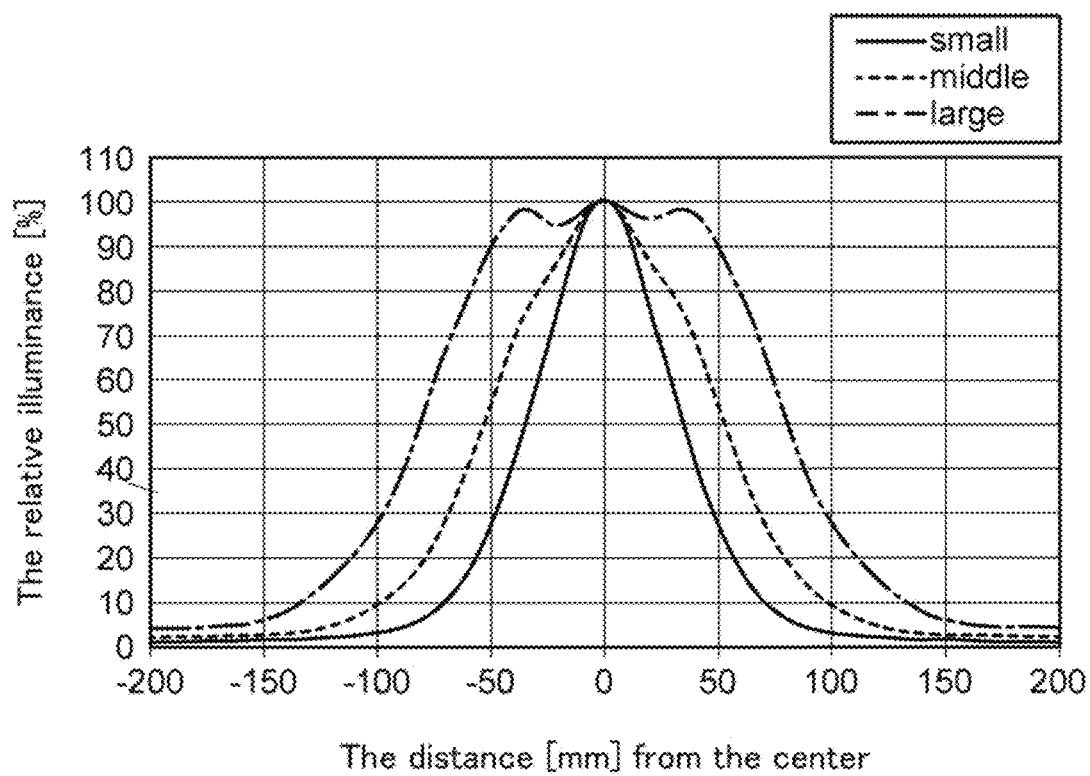
FIG. 8B is a graph showing a relative illuminance distribution based on a simulation using the light pipe of the first embodiment of the present invention.

FIG. 8B is a graph showing a relative illuminance distribution based on the illuminance at the central portion of the irradiated surface (which is indicated as 100%) in each of the modes shown in FIG. 8A.

Figure 9A:
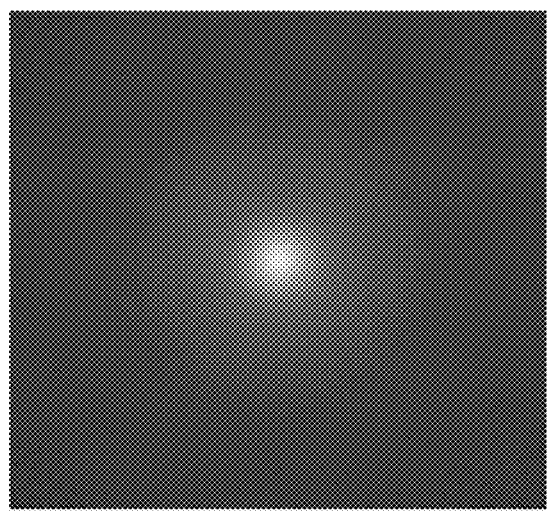
FIG. 9A is an image of a light-emitting surface obtained using the light pipe of the first embodiment of the present invention.

FIG. 9A is an image of the irradiated surface in the small mode in the simulation.

Figure 9B:
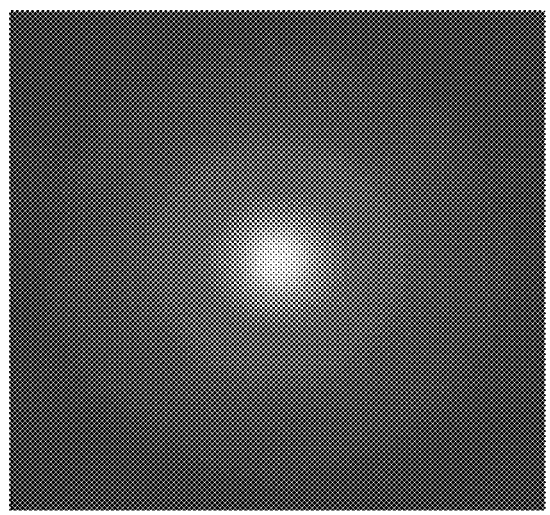
FIG. 9B is an image of a light-emitting surface obtained using the light pipe of the first embodiment of the present invention.

FIG. 9B is an image of the irradiated surface in the middle mode in the simulation.

Figure 9C:
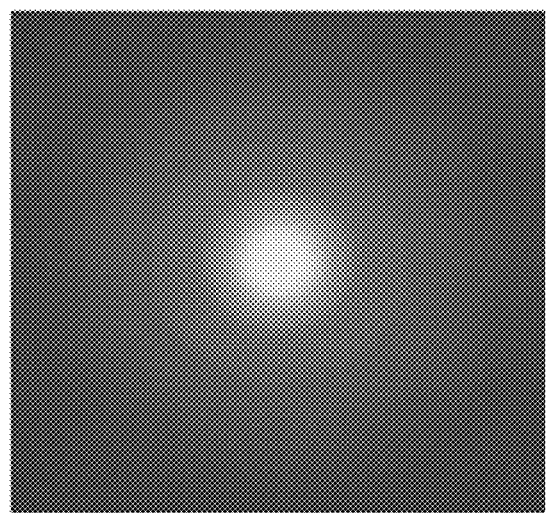
FIG. 9C is an image of a light-emitting surface obtained using the light pipe of the first embodiment of the present invention.

FIG. 9C is an image of the irradiated surface in the large mode in the simulation.

In FIG. 8B, the irradiation diameters at a relative illuminance of 50% are 69 mm in the small mode, 106 mm in the middle mode, and 162 mm in the large mode. According to the results of this simulation, it can be confirmed that the size of the irradiated region can be adjusted using the light pipe 20 according to the first embodiment. In addition, light-emitting surfaces with reduced unevenness in color and illuminance can be obtained as shown in FIG. 9A to FIG. 9C.

The luminance of the central LEDs 11, the luminance of the peripheral LEDs 12, and the luminance of the peripheral LEDs 13 can be appropriately controlled so that the illuminance is uniform on the light-emitting surface (light exit surface 24a) of the light pipe 20.

For example, in the example shown in FIG. 5B, the distances between adjacent ones of the peripheral LEDs 13 are longer than the distances between adjacent ones of the peripheral LEDs 12, and the distances between adjacent ones of the peripheral LEDs 12 are longer than the distances between adjacent ones of the central LEDs 11. In this arrangement, for example, with the luminance of the peripheral LEDs 12 higher than the luminance of the central LEDs 11 in the middle mode, or with the luminance of the peripheral LEDs 13 higher than the luminance of the peripheral LEDs 12 and making the luminance of the peripheral LEDs 12 higher than the luminance of the central LEDs 11 in the large mode, the in-plane illuminance distribution on the light-emitting surface can be uniform.

The embodiment described above includes one columnar light-guide portion 21 and two annular light-guide portions 22 and 23, so that the size of the light-emitting surface can be adjusted in three levels.

Meanwhile, one annular light-guide portion can be disposed, or three or more annular light-guide portions can be disposed so that the size of the light-emitting surface can be adjusted in four or more levels.

The insides of the grooves 26 and 27 are not limited to gaps, but a material having a refractive index lower than the refractive index of the material of the light-guide portions 21 to 23 may be charged in a respective one of the grooves 26 and 27.

One embodiment of the present invention has been described above referring to specific examples. The scope of the present invention is not limited to these specific examples. All embodiments that can be made through appropriate design changes made by a person skilled in the art on the basis of the above-described embodiment of the present invention are within the scope of the present invention as long as the embodiments involve the gist of the present invention. In addition, a person skilled in the art may consider various variations and modifications within the idea of the present invention. Therefore, those variations and modifications are also within the scope of the present invention.

What is claimed is:

1. An illumination device comprising:
a light source;
a reflector;
a light pipe comprising:
an emission end portion having a light exit surface;
a columnar light-guide portion protruding from a surface of the emission end portion opposite to the light exit surface, said columnar light-guide portion having a solid cylindrical shape; and at least one annular light-guide portion protruding from the surface of the emission end portion opposite to the light exit surface and concentrically surrounding the columnar light-guide portion while spaced apart from the columnar light-guide portion, wherein the light pipe is positioned between the reflector and the light source such that light from the light source enters the light pipe at an end of the columnar light-guide portion opposite the surface of the emission end portion from which the columnar light-guide portion protrudes.

2. The illumination device according to claim 1, further comprising a gap separating the at least one annular light-guide portion from the columnar light-guide portion via a gap.

3. The illumination device according to claim 1, wherein the emission end portion, the columnar light-guide portion, and the at least one annular light-guide portions are made of a resin material as an integrated body.

4. The illumination device according to claim 1, wherein the light pipe further comprises:

an annular groove separating the at least one annular light-guide portion from the columnar light-guide portion, wherein lateral surfaces of the columnar light-guide portion and the at least one annular light-guide portion are inclined such that a width of the groove increases from the emission end portion toward the end of the columnar light-guide portion.

5. The illumination device according to claim 1, wherein the at least one annular light-guide portion comprises at least two annular light-guide portions apart from each other.

6. The illumination device according to claim 5, further comprising at least one gap separating the at least two annular light-guide portions from each other.

7. The illumination device according to claim 5, wherein the light pipe further comprises:

a first annular groove separating the at least two annular light-guide portions from the columnar light-guide portion, and a second annular groove separating the at least two annular light-guide portions, wherein a width of the second annular groove greater than a width of the first annular groove.

8. The illumination device according to claim 1, wherein the light source comprises:

at least one central LED facing an end of the columnar light-guide portion in a protruding direction of the columnar light-guide portion; and a plurality of peripheral LEDs annularly arranged along a circumference of the one annular light-guide portion to face an end of the one annular light-guide portion in the protruding direction, or annularly disposed along circumferences of the two or more corresponding annular light-guide portions to face ends of the two or more annular light-guide portions in the protruding direction.

9. The illumination device according to claim 8, wherein the plurality of peripheral LEDs comprise at least one first LED and at least one second LED alternately arranged in an annular direction, and wherein an emission color of the at least one first LED differs from an emission color of the at least one second LED.

10. The illumination device according to claim 8, further comprising:

a diffuser disposed to face the light exit surface of the light pipe.

11. The illumination device according to claim 8, wherein the at least one central LED and the plurality of peripheral LEDs are separately controlled.

* * * * *